United States Patent Office 3,465,884
Patented Sept. 9, 1969

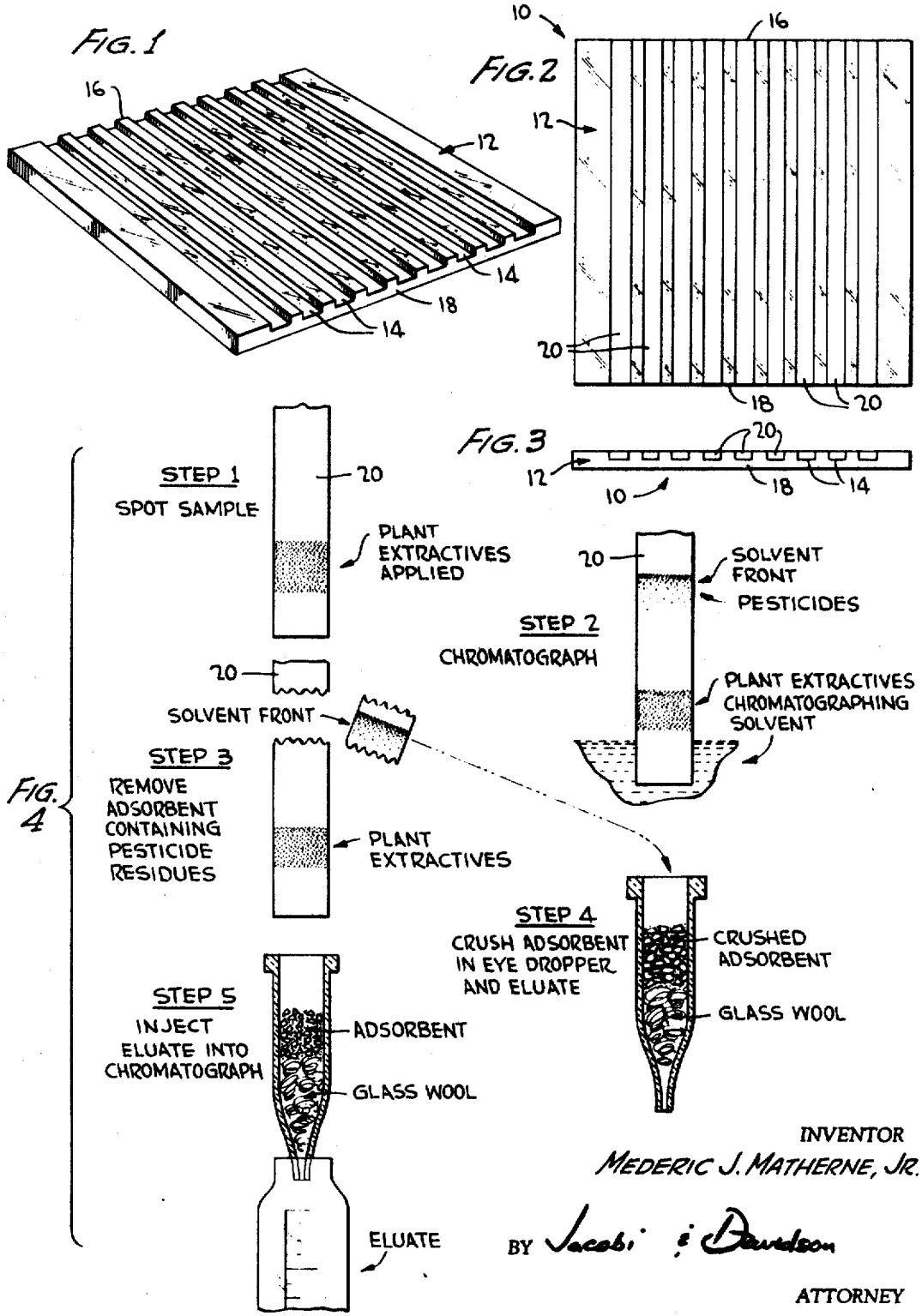

---

3,465,884
CHANNEL LAYER CHROMATOGRAPHY
Mederic J. Matherne, Jr., New Orleans, La., assignor to the United States of America as represented by the Secretary of the Department of Health, Education, and Welfare
Filed Sept. 25, 1967, Ser. No. 670,131
Int. Cl. B01d 23/10, 15/08
U.S. Cl. 210—323                                    7 Claims

---

ABSTRACT OF THE DISCLOSURE

Channel layer chromatography wherein a common support element having a plurality of channels filled with a chromatographic adsorbent material is utilized for simultaneous multiple separations. The technique provides for the product capacity of column chromatography with the speed of thin layer chromatography. Particular applicability as a cleanup procedure for pesticide residue analysis is shown.

---

This invention relates to new chromatographic devices and relates more particularly to a development which may be referred to as "channel layer chromatography."

Numerous chromatographic procedures are presently known among the more common of which are column chromatography and thin layer chromatography. Column chromatography is frequently desirable because of its high capacity for product material, but this technique suffers from numerous well-known disadvantages. For example, column chromatography is relatively slow, frequently requiring from one-half hour to as much as a full day for an adequate separation. Further, this procedure requires relatively high volumes of chromatographic solvent. These two considerations alone, that is, high time and solvent requirements, render column chromatography relatively undesirable for certain applications.

In contrast to column chromatography, thin layer chromatography is a relatively high speed procedure generally requiring from only 10–20 minutes for an individual separation. Further, this technique utilizes minimal quantities of chromatographic solvent. However, thin layer chromatography suffers from the critical disadvantage that it has almost no usable product capacity whereby its applications are extremely restricted. In order to obtain even minimal product capacity with thin layer chromatography, the samples must be smeared over an extremely wide portion of a plate thereby making subsequent analyses extremely difficult.

Thus, it will be seen that there are some significant limitations on the use of these prior art chromatographic techniques from the standpoint of either cost in time or materials, or product capacity.

Another disadvantage inherent in both of the above prior art chromatographic techniques as they are presently practiced is the difficulty encountered in running large numbers of individual samples or in running samples and controls therefor under at least substantially indentical environmental and processing conditions. Since column chromatography and thin layer chromatography are each only primarily adapted for individual separations, duplication of equipment and processing variables encountered in multiple separations as presently practiced by either of these procedures renders them relatively inefficient and unreliable.

The instant inventive concepts combines the advantages of column and thin layer chromatography while overcoming the aforementioned and other disadvantages inherent in each technique. Specifically, it is a primary object of this invention to provide chromatographic devices which offer a product capacity comparable to column chromatography, but which function at speeds comparable to thin layer chromatography. Further, it is a basic object of this invention to provide for chromatographic devices which are extremely compact and simple to utilize requiring less chromatographic solvents than prior art devices and procedures of comparable capacity.

The instant inventive concepts also provide chromatographic techniques which reduce health hazards to personnel from exposure to solvents, topically or by inhalation and which similarly reduce exposion and fire hazards.

Additionally, and with particular reference to the background set forth above, it is an important object of this invention to provide chromatographic devices which permit simultaneous separation of numerous product samples under at least substantially identical processing conditions in a simple, inexpensive, highly efficient and reliable manner.

The instant inventive concepts are broadly useful as a new chromatographic separation technique in general and in any analytical area where such procedures are ordinarily found. In effect, this invention provides for chromatography in a form which is distinct from existing techniques such as the column and thin layer chromatography mentioned previously as well as other conventional chromatographic procedures such as paper chromatography, gas chromatography and the like and may be said to be a general tool for chemical analyses which affords chromatographic separations of chemicals or materials which are present together in a mixture.

Although, as has been stated immediately hereinabove, the instant inventive concepts are not to be limited to a particular application, one area is which various chromatographic procedures have been utilized extensively hereinbefore, and wherein the devices and procedures of the instant invention are believed to be particularly useful, is the separation of pesticide residues from co-extracted plant material. Thus, a special object of this invention is the provision of a new cleanup procedure for pesticide residue analysis which may be utilized as a primary cleanup procedure in this field or to supplement other presently existing cleanup procedures.

Other and further objects of the instant invention reside in the combination of elements, arrangement of parts and features of construction of the devices set forth hereinafter, as well as the specific manipulative steps and materials utilized in the procedures hereof.

Still other objects will in part be obvious and in part be pointed out as the description of the invention proceeds and as shown in the accompanying drawing wherein:

FIGURE 1 is a perspective view of a preferred embodiment of a channel layer chromatographic plate in accordance with the instant inventive concepts prior to filling the channels thereof with chromatographic adsorbent material;

FIGURE 2 is a front elevational view of the plate of FIGURE 1 showing the channels thereof filled with chromatographic adsorbent material;

FIGURE 3 is a bottom edge elevational view of the plate as shown in FIGURE 2; and FIGURE 4 is a schematic flow diagram showing the use of the instant inventive concepts as a cleanup procedure for pesticide residue analyses, only a single channel layer strip being illustrated for convenience.

Like reference characters refer to like parts throughout the several views of the drawing.

Referring now to the drawing in general, and more particularly to FIGURES 1–3, a channel layer chromatographic plate in accordance with a preferred embodiment of the instant invention concepts is designated generally by the reference numeral 10 and will be seen to comprise a common plate or support element 12 in which has been defined in any conventional manner a plurality of substantially parallel spaced channels 14 extending from the top edge 16 to the bottom edge 18 thereof. The channels 14 are filled in a manner to be more fully described hereinafter with a chromatographic adsorbent material to provide a plurality of discrete channel layer strips 20.

In the embodiment shown, the support member 12 is formed of glass and is substantially square with rectangular channels defined as depressions in one major face thereof. However, these details are not in any way critical and may be varied substantially. For example, the support member 12 may be formed of any suitable alternative solid material including various plastics or metals which would not be subject to attack by the particular chemicals to be utilized in the chromatographic processing. Similarly, the size and shape of the support member 12 can obviously be readily modified, although a flat, 8 inch by 8 inch by ¼ inch plate has been found to be particularly useful. Likewise, the relative dimensions of the channels 14 are also obviously subject to significant variation without departing from the instant inventive concepts. In the preferred embodiment shown, nine channels, each 10 millimeters wide and 2 millimeters deep have been utilized. The only significant factor in these dimensions is the depth which provides for channel layer strips 20 substantially thicker than the ordinary ¼ to ½ millimeter thickness of adsorbent generally utilized in conventional thin layer chromatography. The individual channels can, in fact, be even substantially deeper and wider according to this invention, for example, up to 10 millimeters deep and 3–5 centimeters wide each. In any event, however, to provide significantly greater product capacity, the individual channels should have a depth over a major portion of the width of the same, at least in excess of 1 millimeter and preferably at least about 2 millimeters. This significantly greater thickness of adsorbent in each of the channel layer strips 20 in and of itself distinguishes the chromatographic device of the instant invention from a thin layer chromatographic plate and provides for substantial increase in product capacity, an important feature of the instant invention.

Although the preferred channels 14 have been shown as rectangular in cross-section and uniformly filled by adsorbent throughout their length, it will be understood that other shapes are well within the instant inventive concepts. For example, the channels can be square in cross-section. Alternatively, they may be V or U-shaped with the angle of the V or radius of the U, as well as the depth and surface width of the channels varying depending upon the intended use. Further, the dimensions of the channel need not be uniform over the entire length of the support plate, but rather, for example, the channels can be sloped to provide a greater depth at one end of the plate than at the other. In this same vein, although the channel layer strips 20 must be continuous over the length of the channels 14, the thickness of the adsorbent material, in contrast to the channels themselves, may be diminished toward the top of the channels or the adsorbent material may be stepped down in thickness toward the top of the plate member. Reduction of the thickness of the channel layer strips toward the top of the same provides maximum product capacity at the bottom or lower end with maximum separation at the top or upper end.

Moreover, although the channels 14 have been illustratively shown as depressions or recessions in one of the major faces of the plate member 12, they can be completely embedded within the plate member except for the open opposite ends. For example, the channels can be defined by longitudinal bores through the plate member from one edge surface to an opposite edge surface, either cylindrical or of any other desired cross-section. Additionally, the channels can be in the form of bores which taper in cross-section from one end of the plate member to the other. Although such closed channel embodiments are feasible and possibly even desirable for certain applications, they are not contemplated for ordinary use and the open-surface channels as shown in the drawing are preferred. With closed channels, only a portion of the channel can be filled with adsorbent material, followed by application of the test sample and then completion of the channel filling. Similarly, removal of the solvent front portion of the adsorbent would have to be effected by pressing the channel layer strip out of one end of the channel from the opposite end. These difficulties in preparation and use of the closed channel embodiments evidence the more limited application of such constructions.

The above-described modifications are merely set forth as illustrative and are not shown in the drawing since numerous other configurations for the channels would be readily recognized by those skilled in the art.

Thus, the basic and significant characteristics of the channels are:

(1) There are a plurality of them, that is, two or more—this permits simultaneous multiple separations;

(2) They are parallel to each other; and (3) They each have a lower open end communicating with a rectilinear portion of the bottom edge of the plate member whereby these open ends of the channels may be said to be coplanar, with the channels generally perpendicular to the rectilinear bottom edge portion.

The basic techniques for preparing and utilizing a channel layer chromatography device such as the element shown at 10 in the drawing will be better understood by reference to the following specific examples.

EXAMPLE 1

Preparation of channel layer chromatographic plate

Place 60 grams of aluminum oxide G such as is available for thin layer chromatography from Brinkmann Instruments, Inc. into a 125 ml. glass-stoppered flask. Add 50 ml. distilled water, stopper, and shake vigorously (ca. 30 sec.) until slurry is no longer watery. Too much water in the slurry will cause the adsorbent to crack and/or contract away from the sides of the channels. The ratio of $Al_2O_3$ may need to be varied for some batches of $Al_2O_3$. If slurry is too thick, correct by (a) shortening shaking period to 15–20 sec.; (b) increasing volume of distilled water by 5–10 ml.; or (c) combining (a) and (b). Immediately pour slurry evenly across middle of plate, at right angles to channels. Spread slurry into channels with the aid of a metal spatula.

It is easier to prepare the channel layer plate if the channels are first covered at each end of the plate. This may be done with masking tape A or with aluminum foil B:

A. Place strip of masking tape, adhesive side up, on work bench; place edge of plate (with ends of channel layer grooves) even with long edge of tape. Smooth excess tape onto back, or underside, of glass plate. The tape now forms a wall which prevents the slurry from running out of the channels. Remove tape when adsorbent is no longer fluid enough to run out of channels.

B. Place plate on aluminum foil, turning up edges of foil at each end of plate. The slurry is prevented from running out of the channels by the aluminum foil at each end.

After the slurry has been spread into the channels, let the plate dry 36–48 hours at room temperature and then store in the dark.

Scrape off excess adsorbent with a razor blade, using ridges between channels as a guide. The ridges should be clean of adsorbent and the channels should contain adsorbent level with the ridges. Trim one end of each channel layer (along edge of plate that is to be the bottom) so that a smooth, flat surface or edge will be presented to the chromatographing solvent.

The use of a plate prepared in the manner of Example 1 will now be described with particular reference to FIGURE 4 and a cleanup procedure for pesticide residue analysis.

EXAMPLE 2

Sample extraction

Prepare and extract product according to Mills et al.[1] as edited in compilation by Barry et al.[2]. Proceed to point where pesticides have been partitioned from acetonitrile extract into petroleum ether, and water has been removed with $Na_2SO_4$. Evaporate measured petroleum ether extract in Kuderna-Danish apparatus to ca. 5 ml. Continue evaporation to 2 ml. on heating block at 37° C. or in beaker of warm water (held at 35–40° C.), using stream of clean, dry air.

Application of product extract onto channel layers

Several samples of the same product extract may be applied to selected channels in a single plate. Alternatively, or additionally, control or standard materials as well as other product extracts may be run simultaneously on different channels in a single plate. For simplicity of illustration only a single channel layer strip has been shown in FIGURE 4, although it will be understood that a plurality of chromatographic separations are run simultaneously according to the instant inventive concepts.

Apply an appropriate volume of product extract (ca. 10–20 g. sample) to the channel layer, with a 100 μl. or other suitable syringe. Volumes of 500 μl. and 1 ml. have been applied without difficulty.

Apply extract evenly over a 15–25 mm. length of the channel layer strip from lateral edge to edge, about 15–20 mm. from the bottom edge (see Step 1, FIGURE 4). The rate of application is governed by the speed at which the solvent penetrates the adsorbent. Do not let the solvent extract migrate onto the glass surface adjacent to the channel layer. Wash the extract down into the channel layer strip by applying 100–200 μl. petroleum ether to the area of application.

Chromatographing the applied product extracts

Add ca. 40 ml. of a 1+1 mixture of acetonitrile and tetrahydrofuran to a trough on the bottom of a conventional chromatographic tank and place the channel layer plate in the tank. Do not saturate the tank before inserting the plate. Position the bottom edge of the plate (bearing evenly trimmed channel layer strip edges) in the glass trough so that the solvent is in contact with each channel layer strip, but does not touch the applied sample extract. Cover the tank and let the solvent rise ca. ⅝ to ¾ of total height of the channel layer strips. Remove the plate and mark solvent front with a grease pencil on the clean glass ridges adjacent to the channel layer strips or on the back of the plate, and air-dry in a hood (ca. 20 min.).

Re-chromatograph as before, using acetonitrile only. Let this solvent front go about 15–20 mm. above the first solvent front. Remove the plate and mark the second solvent front. Air-dry about 20 min. (see Step 2, FIGURE 4). Solvent fronts may vary with the individual channels, since they depend upon the products, the amount applied and the ability of the solvents to penetrate it. Solvent fronts may migrate with some adsorbents after removal of the plate from the tank.

[1] "Changes in Methods," JAOAC, 49, pp. 206–250 (1966).
[2] Pesticide Analytical Masual, vol. I, Barry et al., FDA (1965)

Removal of the isolated pesticide residues from the channel layer strip

Quantitatively remove the channel layer adsorbent from 4–7 mm. above the second migrated front, if migration occurs, to 4 mm. below the first solvent front. The section of the channel layer strip within the two solvent fronts contains the pesticide residues extracted from the product (see Step 3, FIGURE 4).

With a thin blade-like instrument, remove and discard the channel layer material which is more than 4–7 mm. above the second solvent or migration front. Quantitatively remove the next section to about 4 mm. below the first solvent front, by scraping same into a small beaker. Powder the material and quantitatively transfer the same to a micro funnel containing a glass wool plug (see Step 4, FIGURE 4). Elute pesticides from the micro funnel with 10 ml. petroleum ether into a small graduated cylinder. Concentrate the eluate at 37° C. if necessary. Inject an appropriate volume of the eluate into conventional gas chromatograph for the determinative step (see Step 5, FIGURE 4).

The techniques and materials step forth in Examples 1 and 2 above, as indicated, are merely illustrative and may be readily modified within the skill of the art. For example, although aluminum oxide G has been utilized as the chromatographic adsorbent, other well-known materials may be readily substituted therefor. For example, in place of aluminum oxide G, slurries may be formed of silica gel, plaster of Paris or the like. The basic significant factor regarding the adsorbent material, in addition to its adsorbent properties, is its capillary properties. In other words, the material utilized to fill the channels must be capable of drawing chromatographic solvent up past the limited zone to which the product extract has been applied so as to form a solvent front thereby segregating various materials from the product extract mixture.

In order to further appreciate the capacity and efficiency of the channel layer chromagraphic cleanup technique of the instant invention the following illustrative examples should be considered:

EXAMPLE 3

Low levels of various pesticides were extracted quantitatively from a large amount of "notorious" plant material in a channel layer plate of the preferred dimensions set forth hereinabove and formed according to the preferred techniques of Example 1. Four products which had previously been found to be free of pesticide residues at low levels of detection were chosen: (1) peanuts—a high fat food not routinely extracted with acetonitrile was chosen to provide oil for the composite; (2) onions—an extremely "dirty" product by any cleanup method was chosen to provide the volatiles for the composite; (3) carrots—cleanup with a conventional Florisil column showed that the second eluate (15%) contained interfering response on electron capture gas-liquid chromatography; and (4) cabbage—cleanup with Florisil showed that the first eluate (6%) contained a large, early response interference on electron capture gas-liquid chromatography and a large sulfur response by microcoulometric gas-liquid chromatography.

Equal amounts of these four comminuted products were combined in a blender and extracted with acetonitrile. Portions of the acetonitrile extract were fortified with low levels of aldrin, dieldrin, endrin, and thiodan, alone and in combination. The fortified acetonitrile portions were then evaporated to a small volume and a quantity of each fortified acetonitrile extract equivalent to 15 grams of the composite plant material was applied directly to the channel layer strip. Excellent recovery of these pesticides at the 0.02, 0.03, and 0.04 p.p.m. levels demonstrates the ability of this cleanup procedure (see Table 1).

TABLE 1.—RECOVERY OF PESTICIDES ADDED TO CRUDE ACETONITRILE EXTRACT OF COMPOSITE [1] AND SPOTTED DIRECTLY ON CHANNEL PLATE

| Portion [2] | Pesticide | Added, p.p.m. | Recovered P.p.m. | Percent |
|---|---|---|---|---|
| 1 | Aldrin | 0.050 | 0.046 | 92 |
| 2 | Thiodan | 0.050 | 0.037 | 74 |
| 3 | Dieldrin | 0.050 | 0.046 | 92 |
| 4 | do | 0.050 | 0.049 | 98 |
| 5 | Aldrin | 0.050 | 0.044 | 88 |
|   | Dieldrin | 0.050 | 0.047 | 94 |
| 6 | do | 0.050 | 0.042 | 84 |
|   | Endrin | 0.050 | 0.049 | 98 |
| 7 | Thiodan | 0.020 | 0.018 | 90 |
|   | Dieldrin | 0.020 | 0.018 | 90 |
| 8 | Aldrin | 0.030 | 0.029 | 97 |
| 9 | Endrin | 0.030 | 0.026 | 87 |

[1] Composite of peanuts, onions, carrots, and cabbage.
[2] Each portion spotted was equivalent to 15 g. of the composite.

Table 2 shows a comparison of pesticides found to be present on a number of fruits and vegetables analyzed by using Florisil and then by substituting channel layer chromatography for the Florisil cleanup in the normal scheme.

TABLE 2.—COMPARISON OF PESTICIDE RECOVERIES (P.P.M.) AFTER CLEANUP WITH FLORISIL COLUMN AND CHANNEL LAYER CHROMATOGRAPHY

| Product [1] | Pesticides detected | Cleanup procedure Florisil column | CLC |
|---|---|---|---|
| Strawberries | Heptachlor | <0.005 | None |
|   | Dieldrin and Aldrin. | <0.005 of each | <0.005 of each |
|   | Toxaphene | 0.28 | 0.74 |
|   | do | 0.46 | 0.37 |
|   | Dieldrin | <0.005 | None |
|   | Toxaphene | 0.24 | 0.19 |
|   | DDT | <0.005 | <0.005 |
|   | DDT | None | 0.06 |
|   | Dieldrin | <0.005 | <0.005 |
|   | Toxaphene | 0.16 | 0.17 |
|   | DDT | None | <0.005 |
| Celery | DDT | None | 0.08 |
| Squash | Dieldrin | [2] 0.12 / 0.18 | 0.14 |
| Parsley | DDT | [3] 8.2 / 10.7 | 11.8 |
| Peaches | DDT | 0.38 | 0.41 |
| Apples | Dieldrin | 0.013 | 0.021 |

[1] In three strawberry samples and one cucumber sample no pesticides were detected with either cleanup.
[2] 0.15 average.
[3] 9.4 average.

Table 3 represents a number of fruits and vegetables with added pesticides. These products were fortified with known quantities of various pesticides after the petroleum ether extraction step. In this way, the efficiency of the cleanup for individual products could be tested.

TABLE 3.—RECOVERY OF PESTICIDES FROM FORTIFIED EXTRACTS OF VARIOUS PRODUCTS WITH THE CHANNEL LAYER CHROMATOGRAPHY CLEANUP PROCEDURE.

| Product | Pesticide | Added, p.p.m. | Recovered P.p.m. | Percent |
|---|---|---|---|---|
| Onions | Aldrin | 0.050 | (1) | --- |
|   | Heptachor epoxide. | 0.050 | 0.052 | 104 |
| Mustard greens | Aldrin | 0.050 | 0.052 | 104 |
|   | Heptachlor epoxide. | 0.050 | 0.049 | 98 |
| Potatoes | Aldrin | 0.050 | 0.041 | 82 |
|   | Heptachlor epoxide. | 0.050 | 0.039 | 78 |
| Green beans | Aldrin | 0.050 | 0.051 | 102 |
|   | Heptachlor epoxide. | 0.050 | 0.056 | 112 |
| Grapes | Chlordane | 0.034 | 0.038 | 112 |
| Apples | Lindane | 0.040 | 0.036 | 90 |
|   | Heptachlor | 0.040 | 0.034 | 85 |
|   | Aldrin | 0.060 | 0.055 | 92 |
|   | DDT | 0.080 | 0.094 | 118 |
| Tomatoes | DDT | 1.62 | 1.81 | 112 |
| Turnips | Aldrin | 0.060 | 0.052 | 87 |
|   | Dieldrin | 0.080 | 0.077 | 96 |
|   | Thiodan | 0.12 | 0.105 | 88 |
|   | Endrin | 0.080 | 0.082 | 102 |
| Hot peppers | Heptachlor epoxide. | 0.060 | 0.057 | 95 |
|   | Dieldrin | 0.10 | 0.082 | 82 |

[1] Peak masked by crop on gas-liquid chromatogram.

Of the nine products tested, only onions showed interference. Crop peaks masked the detection of aldrin but permitted calculation of the heptachlor epoxide added. For this product, it may be necessary to reduce sample size taken for cleanup or to rechromatograph on channel layer chromatography a second time to detect early eluting pesticides.

This cleanup procedure has also been used successfully to replace the saponification and MgO-Celite column cleanup of the 15 percent eluates of seven soybean samples prior to confirmation by thin layer chromatography as will be seen in Table 4.

TABLE 4.—CHANNEL LAYER CHROMATOGRAPHY CLEANUP OF 15% ELUATES OF SOYBEANS PRIOR TO THIN LAYER CHROMATOGRAPHY

| Sample | Endrin (p.p.m.) in 15% eluate Gas-liquid chromatography, no additional cleanup | Thin layer chromatography, after channel layer chromatography cleanup |
|---|---|---|
| 1 | 0.09 | 0.08 |
| 2 | 0.07 | 0.05 |
| 3 | 0.09 | 0.08 |
| 4 | 0.08 | 0.06 |
| 5 | 0.07 | 0.05 |
| 6 | 0.12 | 0.14 |
| 7 | 0.07 | 0.04 |

Channel layer chromatography, on aluminum oxide G in the form of discrete 8″ strips, 2 mm. thick by 10 mm. wide, retards the movement of plant extractive but has little or no effect on the migration of pesticides. Chlorinated organic insecticides respond immediately to the rising solvent front and move with the front in the form of a tight band or line. This was illustrated by a limited experiment where the channel layers were dissected and treated with silver nitrate to locate the position of the chlorinated pesticides. Plant extractives retard this movement only slightly. Because of this, the channel layer strips were chromatographed twice to insure that the pesticide residues are quantitatively present at the solvent front.

Tetrahydrofuran, an organic solvent with properties similar to acetonitrile, better penetrates the plant material and extracts the pesticide from it in the initial development. However, when tetrahydrofuran was used alone, too much plant material was carried into the area containing pesticides; acetonitrile alone is desirable for the second development step because of its selective preference for pesticides.

Occasionally plant pigments rose up the channel layer strips close behind the solvent front. After re-chromatographing, the pigmentation was contained in the section of the adsorbent to be removed, i.e., the section which contained pesticide residues. Generally the pigmentation did not hinder the electron capture gas-liquid chromatograph determinative step, although it sometimes discolored the eluate. No evidence of the pigment was found on the gas chromatogram.

The aluminum oxide G used is in the non-activated state, that is, it is mixed with water, applied to the channel layer chromatography plate and air-dried. Activation of the channel layer strips with heat (100° C.)R prior to use will stop the movement of all pesticides and plant material. Prepared plates were stored open, in the dark, and were used up to four weeks after preparation.

The normal Florisil cleanup procedure [3] uses two eluting solvents for the purpose of isolating dieldrin and endrin from other chlorinated organic pesticide residues.[4] When the channel layer chromatography cleanup is substituted for the Florisil cleanup in this procedure, dieldrin and endrin residues are recovered together with all chlori-

[3] "Changes in Methods," JAOAC, 49, pp. 206–250 (1966).
[4] Johnson, JAOAC, 45, pp. 363–365 (1962).

nated organic pesticide residues present. Because of this, there may be times when the nonpolar gas chromatographic column used in this study will not be able to separate certain specific pesticides. In such instances, adequate separation of these pesticides can be achieved by using the polar column recommended by Burke and Holswade.[5]

In addition to separation of the chlorinated pesticides set forth hereinabove, channel layer chromatography according to the instant inventive concepts has been utilized in the separation of non-chlorinated pesticides such as Sevin, 1-naphthyl N-methyl carbamate as well as organic phosphate pesticides such as parathion and malathic. Addionally, this technique has been utilized in the separation of the medicinal components from medicated animal feeds, such as, for example, nitrofurazone and furazolidone. These illustrative chromatographic separations will provide some appreciation for the broader applications of channel layer chromatography.

It will now be seen that there are herein provided new and improved chromatographic devices which satisfy all of the objectives of the instant invention, and others, including many advantages of great practical utility and commercial importance.

Since many embodiments may be made of the instant inventive concepts, and since many modifications may be made of the embodiments hereinbefore shown and described, it is to be understood that, unless otherwise specified, all material herein is to be interpreted merely as illustrative and not in a critical sense. Accordingly, what is claimed is:

1. A chromatographic device comprising a plate member having opposed front and rear major faces and a peripheral edge connecting said faces, said peripheral edge including a rectilinear bottom edge portion, portions of said plate member defining a plurality of spaced channels extending in substantially parallel relationship to each other and generally perpendicular to said bottom edge portion of said plate member, one end of each of said channels communicating with said bottom edge portion, and a chromatographic adsorbent material carried by said plate member within each of said channels and extending continuously over substantially the entire length of each of said channels.

2. The device of claim 1 wherein the maximum cross-sectional area of each of said channels is at said one end of the same.

3. The device of claim 2 wherein the maximum depth of each of said channels is at least in excess of 1 mm. and the minimum width of each of said channels is also at least in excess of 1 mm.

4. The device of claim 1 wherein said chromatographic adsorbent is aluminum oxide G.

5. The device of claim 1 wherein said channels are defined as depressions in one of said major faces, said adsorbent filling said channels and having an exterior surface at least substantially coplanar with said one major face.

6. The device of claim 5 wherein each of said channels is rectangular in cross-section.

7. The device of claim 6 wherein each of said channels have a depth of at least about 2 mm. throughout their length.

References Cited

UNITED STATES PATENTS

| 3,194,400 | 7/1965 | Herndon | 210—198 X |
| 3,279,307 | 10/1966 | Wilks | 210—198 X |
| 3,298,527 | 1/1967 | Wright | 210—198 |
| 3,413,842 | 12/1968 | Hecker | 210—198 |

SAMIH N. ZAHARNA, Primary Examiner

U.S. Cl. X.R.

210—31, 198

---

[5] Burke et al., JAOAC, 49, pp. 374–385 (1966).